US008437885B1

(12) United States Patent
Beazley et al.

(10) Patent No.: US 8,437,885 B1
(45) Date of Patent: May 7, 2013

(54) SYSTEM AND METHOD FOR A LAUNCH CONTROL CONSOLE FOR COMMUNICATION WITH UNMANNED UNDERWATER VEHICLES

(75) Inventors: Stuart K. Beazley, Kingston, RI (US); James A. Del Savio, East Providence, RI (US); Richard P. Berube, Portsmouth, RI (US); Christopher Shaw, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/355,704

(22) Filed: Jan. 23, 2012

(51) Int. Cl.
*B63G 8/14* (2006.01)
*G06F 19/00* (2006.01)
*G05D 1/00* (2006.01)

(52) U.S. Cl.
USPC .................................. 701/2; 701/21

(58) Field of Classification Search ............... 701/2, 21, 701/29.1, 29.6, 33.2
See application file for complete search history.

(56) References Cited

FOREIGN PATENT DOCUMENTS
EP        2169631 A2 *  3/2010

OTHER PUBLICATIONS

Nelson, Eric L. 1992. "User Interface Design Strategies for AUVC Software Development". Symposium on Autonomous Underwater Vehicle Technology 1992, AUV '92. 152-157.*
Kao, Mimi; Weitzel, Geoff; Zheng, Xichi; and Black, Mervin "A Simple Approach to Planning and Executing Complex AUV Missions", 1992 Symposium on Autonomous Underwater Vehicle Technology 1992, AUV '92. 95-102.*

* cited by examiner

*Primary Examiner* — Mary Cheung
*Assistant Examiner* — Brian P Sweeney
(74) *Attorney, Agent, or Firm* — James M. Kasischke; Michael P. Stanley; Jean-Paul A. Nasser

(57) ABSTRACT

A system and method of use is provided that includes: receiving configuration information from an unmanned underwater vehicle (UUV); automatically configuring a launch control console (LCC) according to the configuration information; and providing a graphical interface for a user to command the UUV to perform at least one task. The automatic configuration includes formatting commands and the graphical interface to suit a vehicle type and components of the UUV. Other embodiments include: aligning a navigation system in the UUV; selecting a mission; activating components in the UUV corresponding to the mission; and launching the UUV on the mission. Further embodiments include: downloading at least one preset associated with the UUV; modifying the presets; and displaying a status of components and a log of messages on the graphical interface.

9 Claims, 3 Drawing Sheets

SYSTEM AND METHOD FOR A LAUNCH CONTROL CONSOLE FOR COMMUNICATION WITH UNMANNED UNDERWATER VEHICLES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to unmanned underwater vehicles (UUV) and, more particularly, to a system and method for a launch control console to communicate with a UUV.

(2) Description of the Prior Art

A Midsized Autonomous Reconfigurable Vehicle (MARV) is an unmanned underwater vehicle (UUV) that is used for select undersea missions.

Typically, UUVs are used for commercial and military purposes. For example, UUVs may be used by the oil and gas industry to make maps of a seafloor before building subsea infrastructure, pipelines, etc. Military applications may include: determining the existence of mines; monitoring protected areas for unidentified objects; and aiding in detection of manned submarines, etc. UUVs range in size from portable lightweight vehicles to large diameter vehicles over ten feet in length. Many UUVs carry sensors to navigate autonomously and carry out various tasks such as: mapping features on the ocean floor; measuring physical characteristics of sea water (such as temperature, salinity, and dissolved oxygen); detecting chlorophyll from microscopic marine algae; measuring concentrations of small particles in the water; and collecting images of the seafloor and the sea.

UUVs rely on a number of propulsion methods, such as propeller based fins, thrusters, or nozzles. UUVs are typically programmed to perform their mission at the surface. When launched, UUVs navigate through the water and collect data.

UUVs may be equipped with navigation systems, such as inertial navigation systems. An inertial navigation system (INS) may use a computer, motion sensors (accelerometers) and rotation sensors (gyroscopes) to continuously calculate position, orientation, and velocity of the UUV. The INS may be initially provided with a position and velocity from another source (a human operator, a GPS satellite receiver, etc.), and thereafter may compute its own updated position and velocity by integrating information received from the motion sensors. A pressure sensor may measure vertical position (e.g., depth) of the UUV.

The actual and potential range of applications of UUVs for ocean science and related applications is potentially unlimited. As the variety of deployable instruments/sensors increase and their operating costs decrease, UUVs are likely to become common tools for ocean exploration. Currently, many UUVs require manual configuration and setup of their instruments and subsystems. For example, an operator can manually verify that all instruments are installed and if any changes have been made to the vehicle configuration, such as adding or removing an instrument. When the number of UUVs in an organization is large, it may be prohibitively costly to manually configure every UUV before a mission.

The MARV type of UUV encompasses a robust propulsor section that can interact with pneumatic surface ship tube launchers or hydraulic submarine torpedo tube launchers. The MARV contains two thruster sections that allow the vehicle to be recovered inside a submarine torpedo tube when used in conjunction with a compatible remotely-operated vehicle (ROV). The MARV may have other configurations based on particular needs and suitability (for example: chemical sensors, video cameras, side-scan sonar, bathymetry sonar, and a vector sensor).

The MARV may also contain software components, including Casualty Monitoring (CASMON) software, Power Distribution Assembly (PDA) controller software, and Vehicle Controller (VC) software. These software components may be separable by general function but work together to provide an integrated configuration system.

A single organization can support multiple unmanned underwater vehicles such as the MARV with each vehicle having differing components and procedures (for example: start-up procedures, launching checklists, missions, etc). The various configurations may not be plainly visible or identifiable from the exterior of the vehicle. Different procedures and checklists may need to be configured separately for each vehicle. These configurations may have to be checked (and sometimes double checked) to ensure that the user-specified configuration is permitted by existing system parameters and configurations. For at least these reasons, a system and method to automatically configure various vehicle settings for launch control is needed.

SUMMARY OF THE INVENTION

Accordingly, it is a primary object and general purpose of the present invention to provide a method that includes: receiving configuration information from an unmanned underwater vehicle (UUV); automatically configuring a launch control console (LCC) according to the configuration information; and providing a graphical interface for a user to command the UUV to perform one or more tasks. The automatic configuration includes formatting the graphical interface and configuring commands to suit a vehicle type and components of the UUV.

Other objects and advantages of the present invention include: aligning a navigation system in the UUV; selecting a mission; activating components in the UUV corresponding to the mission; and launching the UUV on the mission. More specific embodiments include: downloading one or more presets associated with the UUV; modifying the presets; and displaying a status of components and a log of messages on the graphical interface.

BRIEF DESCRIPTION OF THE DRAWINGS

In accordance with the present invention.

DETAILED DESCRIPTION OF THE INVENTION

Figure 1:
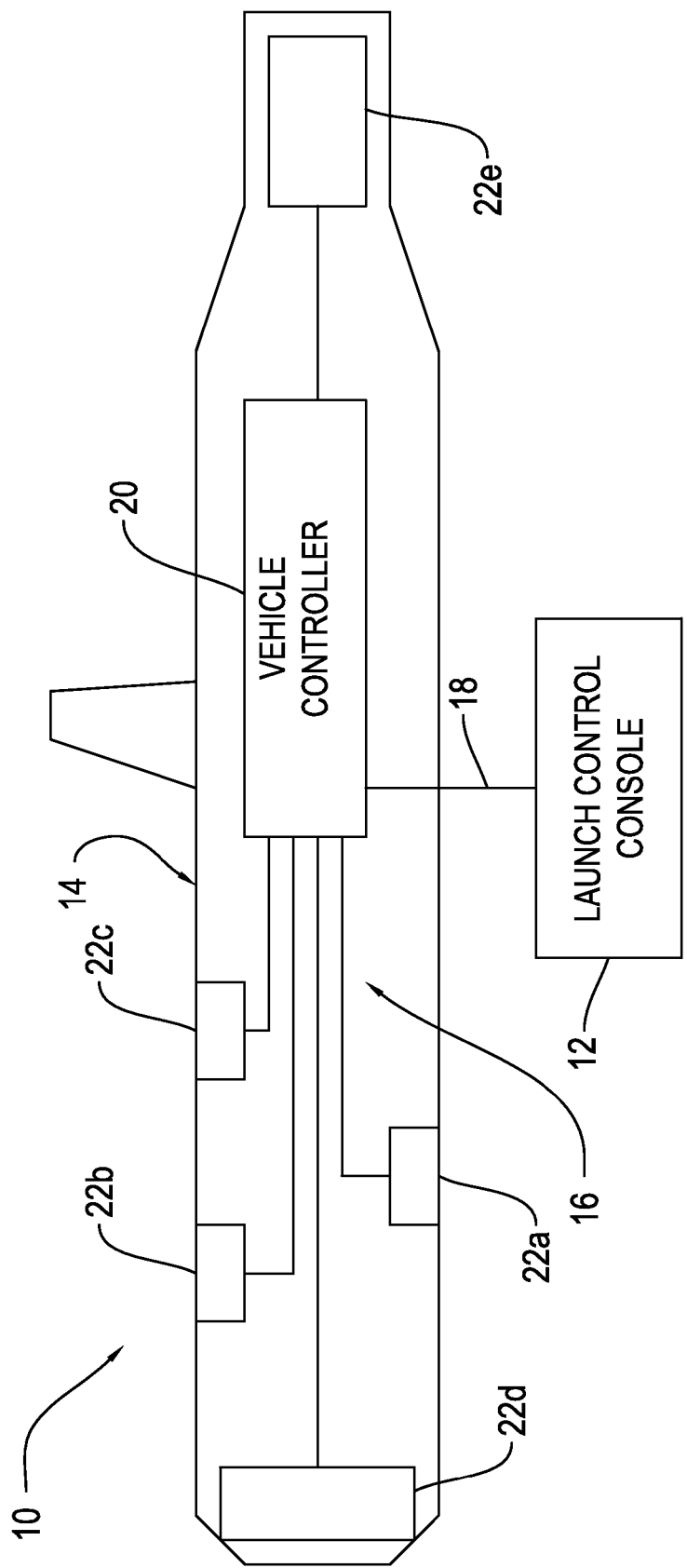
FIG. 1 is a block diagram of an embodiment of a system.

Referring now to the drawings, and more particularly to FIG. 1, the figure depicts a block diagram of a system 10 comprising a launch control console (LCC) 12 for communication with an unmanned underwater vehicle (UUV) 14. In an exemplary embodiment, the launch control console 12 may be a Microsoft Windows application that gives external control over vehicle functions (for example: powering up vehicle components; sending vehicle presets; selecting missions from a mission file; launching the UUV 14, etc.).

As used herein, an unmanned underwater vehicle includes any vehicle that is able to operate underwater without a human occupant. UUVs may include remotely-operated underwater vehicles (e.g., UUVs controlled by a remote human operator), and autonomous underwater vehicles (e.g., UUVs that operate independently of direct human input). The shape of the UUV 14 shown in FIG. 1 is merely for illustrative purposes, and is not intended as a limitation.

The UUV 14 may include a network 16 which connects various components and subsystems (e.g., groups of components, typically working together to perform a function). The LCC 12 may be connected to the network 16 via suitable network connections 18. A vehicle controller 20 communicates with the LCC 12 over the network 16. One or more vehicle components 22 (e.g., 22a thru 22e) may be connected to the vehicle controller 20 over the network 16. In an exemplary embodiment, the vehicle components 22 include side scan sonar (e.g., 22a), a bathymetric sonar (e.g., 22b), a pressure relief valve (e.g., 22c), a tracking transducer, a pressure sensor, cameras, DCO switch, ECO locator pinger (e.g., collectively, 22d) and a propulsor and actuator (e.g., collectively 22e).

The LCC 12 is configured to initiate communication with the UUV 14 and receive configuration information from the vehicle controller 20. The configuration information includes information relevant to navigation and operation of the UUV 14, including vehicle type, component list, display settings, command formats, commands, etc. As used herein, "command" includes a directive to a device, such as the vehicle controller 20, to perform a task specified in the command. For example, "LAUNCH ENABLE" may direct the vehicle controller 20 to prepare certain components for launching the UUV 14 into the sea.

Although the configuration information may vary with vehicle type and components present in the vehicle, the LCC 12 may be independent of the vehicle type and components present in the vehicle and may automatically configure itself based on the configuration information. Automatic configuration includes formatting a graphical interface and configuring commands to suit a vehicle type and components of the UUV 14. As used herein, "formatting" includes arranging features such as images, windows, consoles, text, etc. in a predetermined manner.

The LCC 12 provides a formatted graphical interface for a user to command the UUV 14 to perform one or more tasks. As used herein, "graphical interface" encompasses graphical user interfaces (GUIs), dashboards, command lines, windows, images, text, and any other suitable means of graphical communication that enable a human operator (e.g., the user) to visually interact with the LCC 12. The graphical interface may be provided on suitable display devices. A task may include any suitable operation, such as activation, launch, end run, de-activation, etc.

The LCC 12 may be embodied in an external processor that communicates with the vehicle controller 20. The LCC 12 may be installed on a device, such as a laptop, desktop, server, smartphone, etc. In other embodiments, the LCC 12 may be provided as a stand-alone box, a network application, software-as-a-service, or in any other suitable form and based on particular needs.

The LCC 12 may be independent of vehicle type, and may be used indiscriminately for any UUV in the organization, without apriori knowledge of the particular UUV configuration, components, and parameter settings. The LCC 12 may provide a graphical tool to enable users to enter and verify mission parameters, subsystem configuration settings, and status of vehicle components (e.g., the components 22), among other information and functionalities.

Regarding the infrastructure of FIG. 1, the network 16 can be any local area network (LAN), wireless local area network (WLAN), wide area network (WAN), wireless wide area network (WWAN), wireless single hop or multi-hop vehicle-to-vehicle network, virtual private network (VPN), Intranet, Extranet, or any other architecture or system that facilitates communications in a network environment. The network 16 may include any suitable communication link to the LCC 12 such as wireless technologies (e.g., IEEE 802.11, 802.16, WiFi, WiMax, etc.), satellite, cellular technologies (e.g., 3G, 4G, etc.), etc., or any combination thereof. The network 16 may also include configurations capable of transmission control protocol/Internet protocol (TCP/IP) communications, user datagram protocol/IP (UDP/IP), or any other suitable protocol, where appropriate and based on particular needs.

In another embodiment, the network connections 18 may include a 100 Base-TX RJ-45 wire connector (e.g., used during lab testing) or a single-mode fiber-optic connector (e.g., used during tethered vehicle operations). In yet another example embodiment, the network connections 18 may include wireless bridges (e.g., for non-tethered autonomous vehicle operations).

The vehicle controller 20 communicates with the suitable components 22 (e.g., navigation sensors, measurement instruments, etc.), and enables controlling functions required for navigation and operation. The vehicle controller 20 may be provisioned with a configuration file comprising key aspects of controlling software, such as autopilot and a component configuration. New components may be integrated into the UUV 14 by updating the configuration file in the vehicle controller 20 and recompiling the configuration file.

In an exemplary embodiment, the LCC 12 may access a mission file to enable a user to command the UUV 14 to perform one or more tasks suitable to a particular mission. Missions may be programmed into the vehicle controller 20 in a mission file. In another embodiment, the mission file may be stored in a separate hard disk or memory.

The mission file may contain a list of components and subsystems relevant to a particular mission. The mission file may also contain any sequence for data collection, event logs, etc. For example, the mission file may be an ASCII file containing a location goal of a mission (e.g., co-ordinates of the location goal in latitude and longitude), speed to be used, maximum depth to attain, events to log, etc.

A preset file comprising presets associated with the UUV 14 may be used to provide vehicle settings to the UUV through the LCC 12. As used herein, "presets" encompass vehicle settings such as battery threshold, proper salinity for Doppler velocity logger, proper auto-pilot settings for vehicle gains (e.g., to ensure the vehicle swims straight and level), specifications for safe operating envelope between seawater surface and seafloor, casualty responses (e.g., tasks to be performed in response to a casualty event such as a collision, subsystem break down, etc.), acoustic modem transfer information, vehicle end-of-run procedures, etc.

The LCC 12 may permit a user to download the presets from a preset file stored on the user's computer or on a network device that is separate from the UUV 14. In one embodiment, the preset file may contain a master list of presets for all UUVs in the organization. The UUV 14 may access the preset file and choose applicable presets relevant to its vehicle type. Also, the preset file may be in any suitable format, e.g., ASCII, or XML, etc.

In an exemplary embodiment, the LCC 12 may be provisioned with a navigation mode. During initial setup, the navigation mode may be reached after activating a navigation system. The navigation mode may be a default mode that the LCC 12 may attain (for example: after losing communication with the UUV 14). In an example scenario, when the UUV 14 is launched and submerges underwater, the LCC 12 may lose communication with the UUV. When the UUV 14 resurfaces after the mission, the LCC 12 may reconnect to the UUV in the navigation mode.

In operation, after the LCC 12 is activated, the LCC may wait for the vehicle controller 20 to send a configuration message comprising configuration information (for example: identifying various parameters, such as vehicle type and any currently present components such as vehicle components 22a thru 22e). The vehicle controller 20 may also provide status information concerning each component 22. The LCC 12 may be automatically configured to suit the particular vehicle type and components 22. In an exemplary embodiment, a graphical interface may be formatted to display the components 22a thru 22e according to their corresponding graphical display formats such as boxes, circles, text, etc. The LCC 12 may provide a formatted graphical interface for a user to command the UUV 14 to perform tasks.

Automatic configuration includes configuring commands. For example, a LAUNCH command for a particular vehicle type may involve preparing a set of components for launch. Alternatively, a LAUNCH command for another vehicle type may involve preparing another set of components for launch. In another example, a particular command X may correspond uniquely to a particular component and the LCC 12 may be configured to reject command X in the absence of the particular component. The automatic configuration process may ensure consistency each time that a vehicle change is made. The automatic configuration process reduces a chance for errors and makes the system 10 more user-friendly.

After initial start-up, vehicle data and status may be periodically sent from the vehicle controller 20 to the LCC 12 for various purposes (e.g., to alert the user). Typically, such feedback may be continuously provided, but different intervals may be used, based on suitable needs. In an exemplary embodiment, the LCC 12 may use the vehicle data to create a National Marine Electronics Association (NMEA) message, which can be sent to a tracking computer via a UDP network socket to display the positional data using hydrographic survey software. The NMEA messaging functionality may permit users to keep track of the vehicle location in relation to the operation of support craft, test range and other vehicles.

Operation of the UUV 14 may be accomplished through one or more user commands (e.g., series of commands) from the LCC 12 that direct the vehicle controller 20 through one or more modes leading to a launch of the UUV. The LCC 12 may also send activation commands to the vehicle controller 20 for a subsystem that required for the next mission.

As part of the launch procedure, the LCC 12 may force the user to make any safety checks before vehicle propulsor and subsystems can be activated. In one embodiment, until all safety checks are complete, the LCC 12 may prevent power from being delivered to the vehicle subsystems. In another embodiment, all vehicle presets may be downloaded to the vehicle controller 20 before loading a mission. A mission may be established and properly selected from the mission file. Vehicle subsystems must be powered up in an appropriate order. The propulsion system must be enabled according to safe procedures and the navigation system must be properly activated and aligned.

As part of system monitoring, the LCC 12 may display a subsystem failure or a vehicle casualty on the graphical interface 30 (for example: by using a red color). Whether a subsystem has failed or not, the operator can select a subsystem status button to display a descriptive log of all status bits that are set. Log files of events and status may also be stored in the UUV 14, and accessed by the LCC 12. Once the UUV 14 is launched, the vehicle controller 20 may automatically determine if a casualty constitutes an end-of-mission as defined in the casualty preset.

The LCC 12 may display a log of messages sent by the vehicle controller 20 and messages sent to vehicle controller. These messages may include prompts for any incorrect or improper commands. The log may also contain internal messages (for example: when the UUV 14 changes operating modes). In another embodiment, the logs may be stored in storage devices in the UUV 14 and accessible by the LCC 12.

According to one embodiment, the LCC 12 may be used for system testing through diagnostics working on actual components, simulated components, or a combination of actual and simulated (e.g., virtual) components. Such capability allows UUVs to be tested in a laboratory environment without having to be tested in the ocean. Various types of such testing may be performed before conducting an ocean operation.

Figure 2:
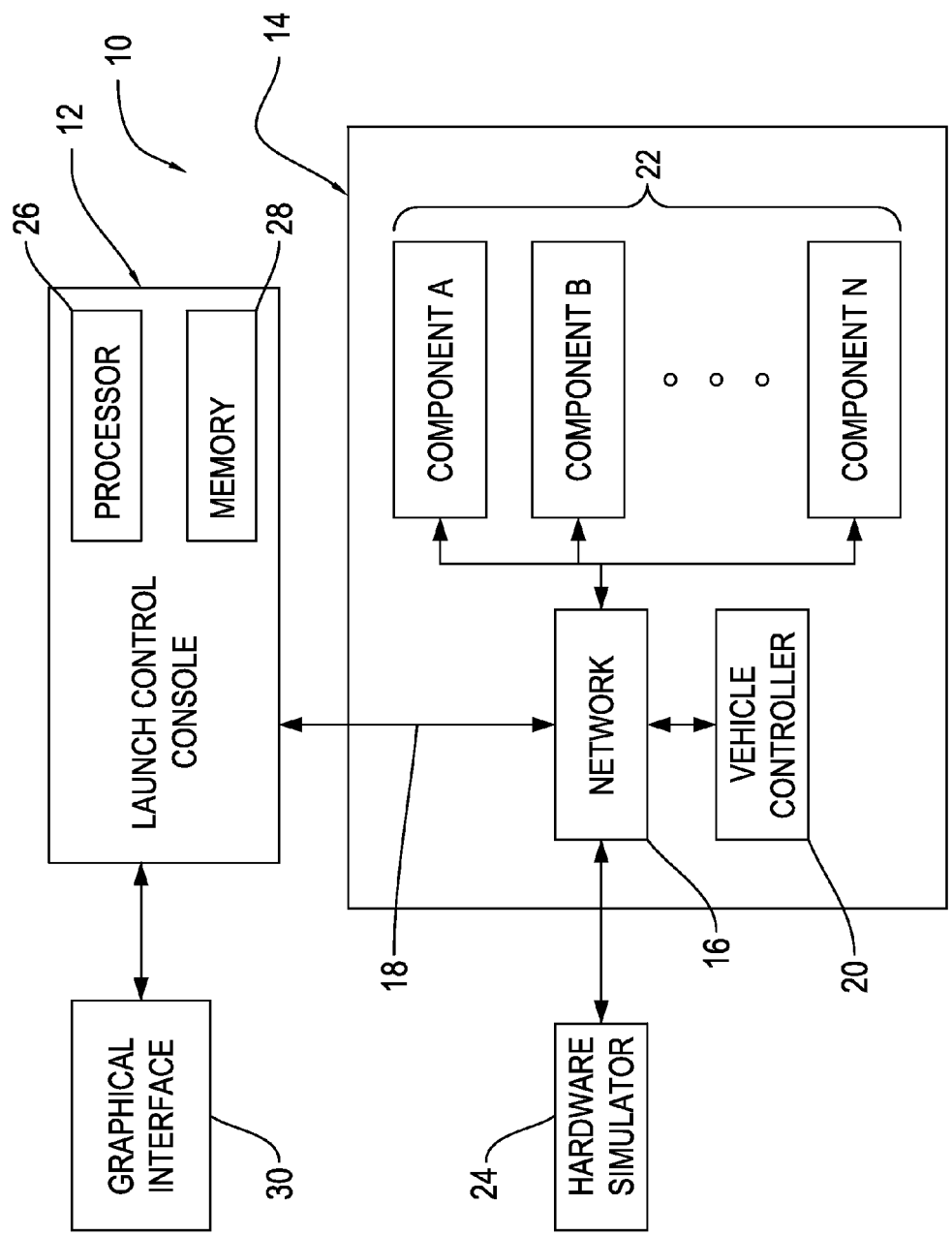
FIG. 2 is a block diagram of another embodiment.

Referring now to FIG. 2, the figure depicts a block diagram of the system 10. The LCC 12 comprises a processor 26, memory 28 and a graphical interface 30. The graphical interface 30 includes any graphical interface capable of being displayed on one or more display devices (e.g., a cathode ray tube (CRT), a light emitting diode (LED), a liquid crystal display (LCD), nanocrystal displays, etc.).

The LCC 12 communicates with the network 16 in the UUV 14 over the network connections 18. The vehicle controller 20 communicates with the LCC 12 and the various components 22 over the network 16. A hardware simulator 24 may communicate with the network 16. The hardware simulator 24 may simulate components of the UUV 14 such as missions, virtual environments, and any other simulation, based on particular needs. The hardware simulator 24 may be used for testing purposes in a laboratory environment, and may be disconnected for ocean operations.

Figure 3:
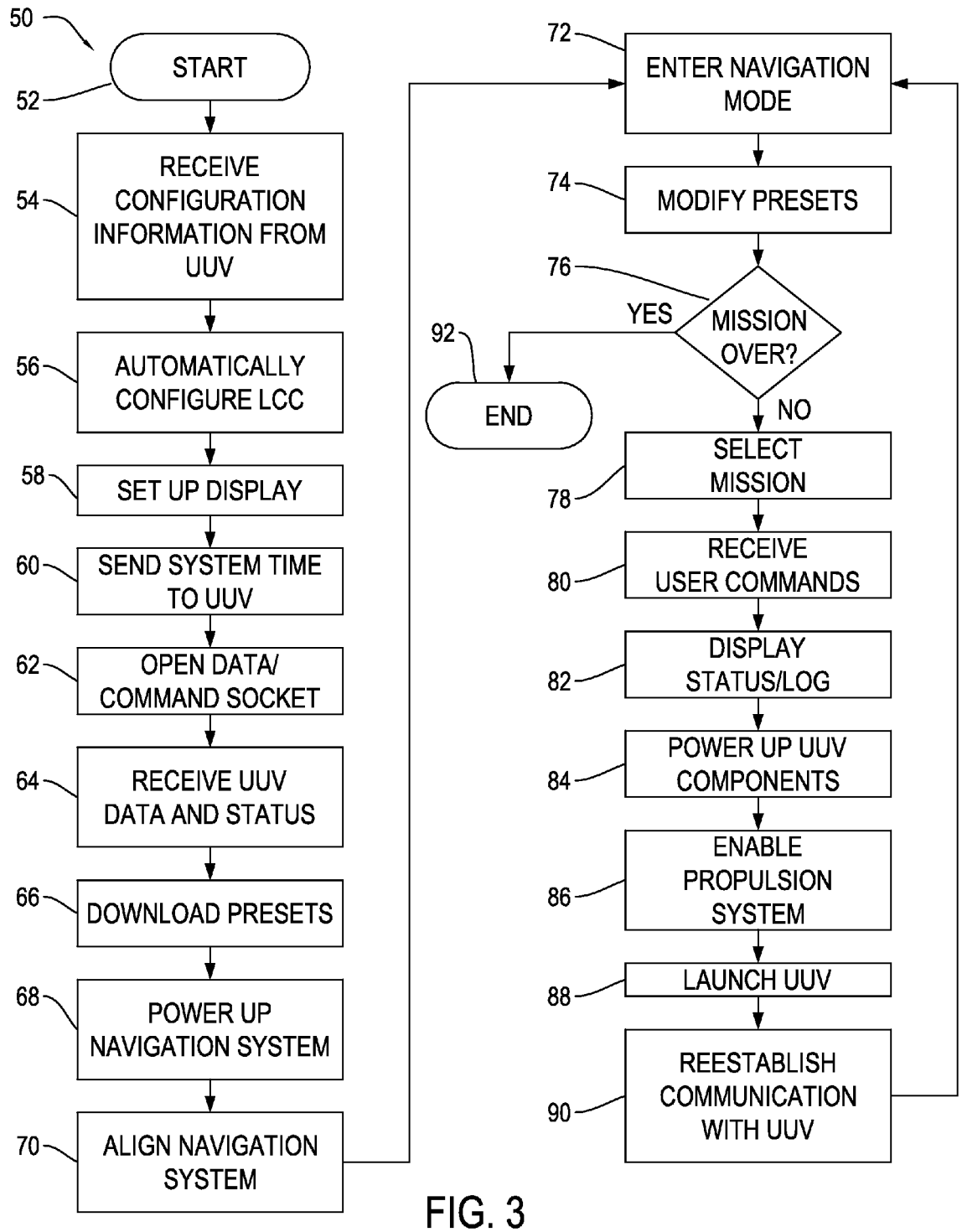
FIG. 3 is a flow-chart that depicts operational steps associated with embodiments of the present invention.

Referring now to FIG. 3, the figure depicts a simplified flow chart of example operational steps that are associated with embodiments of the present invention. Method 50 starts with step 52, when the LCC 12 is activated and the UUV 14 initiates communication with the LCC. In step 54, the LCC 12 receives configuration information from the UUV 14. In step 56, the LCC 12 automatically configures itself based on the configuration information. The automatic configuration may include formatting graphical displays and configuring commands suited to the particular vehicle and configuration settings. In step 58, the LCC 12 sets up a display of the graphical interface 30. In step 60, the LCC 12 sends a system time to the UUV 14 (for example, for clock synchronization purposes). In step 62, the LCC 12 opens a data/command socket on a different network port (for example: to permit a user to input commands to the vehicle controller 20).

In step 64, the LCC 12 receives UUV data and status. Step 64 may be repeated any number of times during the course of operation of the UUV 14. For example, the UUV 14 may continuously send data and status information to the LCC 12. In step 66, the LCC 12 downloads presets from a preset file (for example: by presenting a display to the user on the graphical interface 30; thereby, permitting access to a preset file).

In another embodiment, a pull-down menu may be presented. In yet another embodiment, a "File/Open" box may be presented; thereby, permitting the user to browse the network in order to select a preset file to download. Preset information may be communicated to the vehicle controller 20 by the LCC 12.

In step 68, a navigation system of the UUV 14 is powered up or activated. The power up command may be input by the user. Alternately, the power up may be automatically performed by the vehicle controller 20 after receiving preset information. In step 70, the navigation system is properly aligned (for example: the LCC 12 may cause the vehicle controller 20 to communicate with a satellite and map a current location). In another embodiment, location and direction of the UUV 14 may be entered through the graphical interface 30.

In step 72, the LCC 12 enters a navigation mode. In step 74, the LCC 12 presents the user with an option to modify presets by using the graphical interface 30. In an exemplary embodiment, a preset file editor may be associated with the LCC 12. The user may modify presets (for example: for a next mission). In step 74, the user modifies the preset file and downloads the modified file. In step 76, a determination is made whether missions are over. If missions are not over, the user is permitted to select a new mission in step 78. The user may access the mission file located in the UUV 14 to choose a mission.

In step 80, the LCC 12 presents a display on the graphical interface 30 to enable a user to input suitable commands. For example, the user may enter a "LAUNCH ENABLE" command, to inform the UUV 14 to get ready for launch. The vehicle controller 20 then takes steps to prepare subsystems and sensors for launch.

In step 82, the LCC 12 displays status of components of the UUV 14 on the graphical interface 30. The vehicle controller 20 monitors the status of components of the UUV 14 and sends the corresponding information to the LCC 12. The LCC 12 may display the component (or subsystem) status to the user (for example: in various colors on the graphical interface 30). In an exemplary embodiment, a component or subsystem that is not ready to be activated, or that may have failed, is shown in a red color. In another embodiment, the graphical interface 30 may include a casualty display that identifies existing casualties and suitable commands may prompt the user to acknowledge and accept the existing casualties before proceeding with the mission. The LCC 12 may also display a log of messages between the vehicle controller 20 and the LCC on the graphical interface 30. In step 84, UUV components used for the mission are properly powered up or activated. In step 86, a propulsion system of the UUV 14 is enabled.

In step 88, the UUV 14 is launched on the mission (for example: using a "LAUNCH" command). When the UUV 14 goes under water, the UUV can lose communication with the LCC 12. When the UUV 14 returns to the surface of the water, the LCC 12 reestablishes communication with the UUV according to step 90. At this point, the LCC 12 may go back to the navigation mode of step 72, and the process may repeat thereafter. If the missions are over as determined in step 76, the process ends in step 92. The LCC 12 are deactivated and the communication links with UUV 14 are disabled.

In example embodiments, the operations as outlined herein may be implemented by logic encoded in one or more tangible media, which may be inclusive of non-transitory media (e.g., embedded logic provided in an ASIC, digital signal processor instructions, software potentially inclusive of object code and source code to be executed by a processor or other similar machine, etc.). In some of these instances, one or more memory elements (e.g., memory 28) can store data used for the operations described herein. This memory includes the ability to store software, logic, code, or processor instructions that are executed to carry out the activities as described.

Additionally, the LCC 12 and associated components may include: processing elements (e.g., the processor 26) that can execute software or algorithms to perform activities to enable operations of the LCC; communication with the UUV 14; and to route packets by using suitable routing protocols. A processor can execute any type of instructions associated with the data to achieve the operations detailed.

In one example, the processors could transform an element (e.g., data) from one state to another state. In another example, the activities may be implemented with fixed logic or programmable logic (e.g., software/computer instructions executed by a processor) and the elements could be a type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described should be construed as being encompassed within the term 'processor.'

While certain embodiments in the present disclosure have been described with reference to unmanned underwater vehicles systems, the embodiments may be also used with other applications and scenarios. For example, embodiments according to the present invention may be applied in general to systems that implement automatic navigation and vehicle controls (such as airplane drones).

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method of communication with an unmanned underwater vehicle, said method comprising the steps of:
   receiving configuration information from the unmanned underwater vehicle including a vehicle type and components installed;
   automatically configuring a launch control console according to the received configuration information;
   providing an interface with the launch control console based on the received configuration information to permit a user to command the unmanned underwater vehicle to perform at least one task, wherein said automatically configuring step comprises formatting the interface and configuring commands in response to the vehicle type and the installed components;
   specifying a mission at the launch control console, the mission including at least one task and having required components;
   checking the components installed against the required components;

alerting a user when one of the required components is not present as one of the components installed; and providing the specified mission to the unmanned underwater vehicle.

2. The method of claim 1, wherein the step of providing the specified mission to the unmanned underwater vehicle includes transferring at least one preset from the launch control console to the unmanned underwater vehicle.

3. The method of claim 2, wherein the step of providing the specified mission to the unmanned underwater vehicle includes modifying at least one preset at the launch command console and transferring at least one modified preset from the launch control console to the unmanned underwater vehicle.

4. The method of claim 1, further comprising the step of displaying a status of components installed on the interface.

5. The method of claim 1, wherein the launch control console is independent of a type of the unmanned underwater vehicle.

6. The method of claim 1, said method further comprising the step of displaying a log of messages from the unmanned underwater vehicle on the interface.

7. An unmanned underwater vehicle configuration system comprising:
- an unmanned underwater vehicle having a plurality of modular components positioned thereon, said vehicle being capable of providing configuration information;
- a processor positioned external to said vehicle and capable of being joined in communication with said vehicle to receive the configuration information from said vehicle, wherein said processor is capable of providing the selected mission to said vehicle;
- a launch control console configured by said processor based on the configuration information comprising a vehicle type and modular components installed on said vehicle wherein said processor is capable of configuring the launch console based on the vehicle type and the modular components installed on said vehicle and wherein said processor launch control console allows a user to select a mission having required components, said processor being capable of insuring that said required components are modular components installed on said vehicle;
- a display capable of displaying the launch control console in communication with said processor wherein said processor is configured for displaying a status of installed modular components.

8. The apparatus of claim 7, further comprising a component simulator in communication with said processor, said processor being capable of providing configuration information from said vehicle with information from the component simulator.

9. A method of communication with a selected one of several unmanned underwater vehicles, each vehicle being capable of having differing components installed, said method comprising the steps of:
- receiving configuration information from the selected unmanned underwater vehicle including a vehicle type and components installed;
- automatically configuring a launch control console according to the received configuration information wherein said automatically configuring step comprises formatting the interface and configuring commands in response to the vehicle type and the installed components; and
- providing an interface with the launch control console based on the received configuration information to permit a user to command the selected unmanned underwater vehicle to perform at least one task;
- specifying a mission at the launch control console, the mission including at least one task and having required components;
- checking the components installed against the required components;
- alerting a user when one of the required components is not present as one of the components installed; and
- providing the specified mission to the selected unmanned underwater vehicle.

* * * * *